(12) United States Patent
Brink et al.

(10) Patent No.: US 8,515,676 B2
(45) Date of Patent: Aug. 20, 2013

(54) METHOD AND APPARATUS FOR ASSESSING THE INTEGRITY OF A ROCK MASS

(75) Inventors: Abraham Van Zyl Brink, Fochville (ZA); Teboho N. Nyareli, Midrand (ZA)

(73) Assignee: CSIR, Pretoria (ZA)

( * ) Notice: Subject to any disclaimer, the term of this patent is extended or adjusted under 35 U.S.C. 154(b) by 521 days.

(21) Appl. No.: 12/741,475

(22) PCT Filed: Nov. 5, 2008

(86) PCT No.: PCT/IB2008/054611
§ 371 (c)(1),
(2), (4) Date: Jun. 17, 2010

(87) PCT Pub. No.: WO2009/060392
PCT Pub. Date: May 14, 2009

(65) Prior Publication Data
US 2010/0268491 A1 Oct. 21, 2010

(30) Foreign Application Priority Data
Nov. 6, 2007 (ZA) .................................. 2007/09552

(51) Int. Cl.
*G01V 1/48* (2006.01)
*G01B 17/00* (2006.01)
*G01R 23/16* (2006.01)
*G06N 3/02* (2006.01)

(52) U.S. Cl.
USPC ....................... 702/6; 702/39; 702/77; 706/40

(58) Field of Classification Search
USPC ................. 702/56.2, 33, 39, 75, 77; 73/1.82, 73/1.85, 12.01, 570, 579, 649; 175/58; 250/256; 706/13, 20, 22, 40
See application file for complete search history.

(56) References Cited

U.S. PATENT DOCUMENTS

| 7,233,936 B1 * | 6/2007 | Muller et al. .................... 706/52 |
| 7,357,197 B2 * | 4/2008 | Schultz et al. .................. 175/39 |
| 7,831,530 B2 * | 11/2010 | Hashimoto ..................... 706/20 |
| 2004/0179915 A1 * | 9/2004 | Hill et al. ....................... 409/131 |

FOREIGN PATENT DOCUMENTS

| DE | 197 14 899 A1 | 10/1998 |
| EP | 0 361 216 A2 | 4/1990 |
| EP | 1 927 829 A2 | 6/2008 |

OTHER PUBLICATIONS

International Search Report and Written Opinion of the International Search Authority mailed Mar. 16, 2009 in International Patent Application No. PCT/IB2008/054611.

(Continued)

*Primary Examiner* — Marc Armand
*Assistant Examiner* — Ricky Ngon
(74) *Attorney, Agent, or Firm* — Barnes & Thornburg LLP

(57) ABSTRACT

A method for assessing the integrity of a rock mass, the method including impacting the rock mass, capturing an acoustic signal generated as a result of the impact, deriving a frequency distribution for the captured acoustic signal, processing data from the frequency distribution by means of a neural network process applying artificial intelligence to assess the inputted data, and presenting a signal from the neural network process which is indicative of the integrity of the rock mass.

20 Claims, 2 Drawing Sheets

(56) References Cited

OTHER PUBLICATIONS

Cartwright, P et al: "Application of the Acoustic Energy Meter for assessment of tunnel lining condition"; Rock Mechanics—A Challenge for Society; Proceedings of the ISRM Regional Symposium Eurock 2001, Espoo, Finland, Jun. 4-7, 2001, pp. 333-338, XP009113153, ISBN: 978-90-265-1821-8, paragraph [02.1]—paragraph [02.3].

* cited by examiner

METHOD AND APPARATUS FOR ASSESSING THE INTEGRITY OF A ROCK MASS

CROSS-REFERENCE TO RELATED APPLICATIONS

The present application claims the benefit of priority to International Patent Application No. PCT/IB2008/054611 filed 5 Nov. 2008, which further claims the benefit of priority to South Africa Patent Application No. 2007/09552 filed 6 Nov. 2007, the contents of which are hereby incorporated herein by reference in their entirety.

FIELD OF THE INVENTION

This invention relates to a method and apparatus for assessing the integrity of a rock mass. The rock mass may for instance be the hanging wall (or roof) or a sidewall in a mine working such as a haulage, panel or stope.

BACKGROUND OF THE INVENTION

Many underground injuries are caused by the detachment and falling of rock fragments from rock masses in mines, which are unstable. For this reason it is considered important to have a means whereby the integrity, i.e. the stability or otherwise, of a rock mass can be assessed before mine workers enter the mine working and are exposed to potential injury from falling rock fragments.

A technique which has been in use for many years to assess the integrity of a rock mass in a mine working, typically the hanging wall, involves tapping the rock mass with a sounding bar, listening to the sound generated and making an assessment of the integrity of the mass according to the sound which is heard. The sound which is heard is caused primarily by the acoustic wave generated through vibration of the rock mass and other sources, for example the sounding bar, in the surrounding environment. The sound has a unique frequency distribution which must be interpreted in order for a determination to be made of the integrity of the rock mass.

Experienced miners familiar with this technique know that an intact rock mass, i.e. a rock mass which is sufficiently stable to be regarded as safe, will respond to the applied tapping with a relatively high frequency sound, while a detached rock mass, i.e. a rock mass which is insufficiently stable to be regarded as safe, will respond to the applied tapping with a relatively low frequency sound.

Accordingly, if an experienced miner hears a low frequency response, he will categorise the rock mass in question as detached or unsafe, and will usually stipulate that the rock mass must be barred down to detach loose fragments before the area can be declared safe.

The decision making process, i.e. the assessment of the rock mass as safe or not, is however subjective and errors can be made. Such errors may for instance be attributable to the ambient noise level, personal fatigue, inexperience, and the hearing ability of the person making the assessment.

In an effort to provide a more objective assessment technique, U.S. Pat. No. 4,598,588 proposes a detached rock evaluation device in which the rock mass is struck with a sounding bar. The acoustic signal which is generated is captured by means of an accelerometer in contact with the rock mass, and the captured signal is passed through a high frequency band pass filter arranged to pass acoustic signals with a frequency in the specific range of 3000 Hz to 3500 Hz and a low frequency band pass filter with a frequency in the specific range of 500 Hz to 1000 Hz. The signals passed by the band pass filters are compared by a differential amplifier. On the assumption that a detached rock mass will generate an acoustic signal predominantly in the said specific low frequency range and that an intact rock mass will generate an acoustic signal in the said specific high frequency range, the differential amplifier will detect a small amplitude difference between the outputs of the band pass filters for an intact rock mass and a greater amplitude difference for a detached rock mass. Depending on the amplitude difference detected, the differential amplifier outputs a signal indicative of the integrity of the rock mass.

A problem with the proposal in U.S. Pat. No. 4,598,5887 is that it is only suitable for use with rock masses that generate acoustic signals within predetermined frequency ranges whereas in reality the geotechnical properties of rock masses differ vastly from one area to another, to the extent that actual frequency responses may fall outside these ranges. The device described in the US patent is accordingly unsuitable for application in a variety of areas having different geotechnical properties.

Another proposal intended to provide a more objective assessment of the integrity of a rock mass in a coal mine is the so-called Acoustic Energy Meter (AEM) designed by Rock Mechanics Technology Limited. The AEM is placed in contact with the rock mass and a hammer is used to apply an impact to the rock mass. The AEM detects the acoustic response and assesses the integrity of the rock mass on the basis of the rate of decay of the acoustic signal. While this technique may perform well for a detached rock mass forming a simple beam structure, such rock masses are rarely encountered in actual practice and particularly in hard rock environments such as those present in gold and platinum mines.

SUMMARY OF THE INVENTION

According to one aspect of the invention, there is provided a method for assessing the integrity of a rock mass, the method including
impacting the rock mass;
capturing an acoustic signal generated as a result of the impact;
deriving a frequency distribution for the captured acoustic signal;
processing data from the frequency distribution by means of a neural network process applying artificial intelligence to assess the inputted data; and
presenting a signal from the neural network process which is indicative of the integrity of the rock mass.

Capturing the acoustic signal may include capturing the acoustic signal as a digitized time domain signal. The method may include capturing the signal in a circular buffer.

The method may include recognizing an event when the captured signal exceeds a defined threshold value. The defined threshold value may be a moving average of captured signal values in the circular buffer determined by background noise captured in the circular buffer.

Capturing the signal may include storing signal values of the event.

Deriving a frequency distribution may include transforming the captured time domain signal of the event to a frequency domain signal. In particular, the time domain signal may be transformed to a frequency domain signal by means of a Fast Fourier transform algorithm.

Deriving a frequency distribution may include the prior step of defining discrete measurement frequency bands. The method may include the further step of allocating measured frequency domain signal values to the predefined discrete measurement frequency bands.

The method may include obtaining an average value of the measured frequency domain signal values falling within a predefined discrete measurement frequency range to obtain a normalized signal value per discrete frequency band. Processing the data may include feeding the normalized signal value to a neural network process.

Processing the data may include receiving from the neural network process a signal indicative of the fitment of the measured frequency domain signal characteristics to characteristics of the frequency domain signal with which the neural network process was trained.

The method may include the prior step of training the neural network process with the characteristics of frequency domain signal values representative of any one or both of safe and unsafe rock conditions.

Presenting a signal from the neural network process includes generating any one or both of an audio and a visual signal to indicate whether the measured signal values correspond with characteristics of any one or both of safe and unsafe rock conditions.

According to another aspect of the invention, there is provided an apparatus for assessing the integrity of a rock mass, the apparatus including capturing means for capturing an acoustic signal generated as a result of an impact applied to the rock mass;

a computer connected to the acoustic capturing means for deriving frequency domain signal values from captured time domain acoustic signal values;

a neural network model for fitting the measured frequency domain signal values to predefined frequency domain characteristics of a rock mass which is representative of any one or both of safe and unsafe rock conditions; and presentation means for presenting a signal indicative of the fitment of the measured frequency domain characteristics to the predefined frequency domain characteristics to provide an indication of the integrity of the rock mass.

The capturing means may include a solid-state memory addressed in a circular buffer.

The computer may be programmed with Fast Fourier transform algorithms for converting measured time domain signal values to frequency domain signal values.

The computer may be programmed to allocate the measured frequency domain signal values to predefined frequency bands. The computer may be programmed to obtain an average value for the measured frequency signal values per predefined frequency band.

The neural network model may be programmed into the computer to generate an output value indicative of the integrity of the rock conditions.

The presentation means may include any one or both of audio and visual indicators arranged to indicate fitment of the measured frequency domain characteristics to the predefined frequency domain characteristics of any one or both of safe and unsafe rock profiles.

The visible indicator may be in the form of at least one Light Emitting Diode. In one embodiment, there may be a plurality of visible lights, which may be individually illuminated to indicate different rock conditions, for example a stable rock mass of relatively high integrity, an unstable or detached rock mass of relatively low integrity and a rock mass of intermediate integrity.

The audio indicator may be arranged to generate different sounds depending on a fitment value received from the neural network model. For example, there may be an audible sound generator arranged to generate different sounds indicative of these, or other, possible levels of rock conditions.

Preferably, the apparatus may be compact and hand portable. In one embodiment, the apparatus may be adapted for mounting to a miner's hardhat.

The invention will now be described, by way of example only, with reference to the following diagrammatic drawings.

DRAWINGS

DETAILED DESCRIPTION OF THE INVENTION

In this example, the method and apparatus of the invention are used to assess the integrity of a rock mass in a mine working, and more specifically to assess the integrity of the hanging wall, for instance at the commencement of a mine shift, after blasting at a mine face and before mine workers enter the blasted area.

Figure 1:
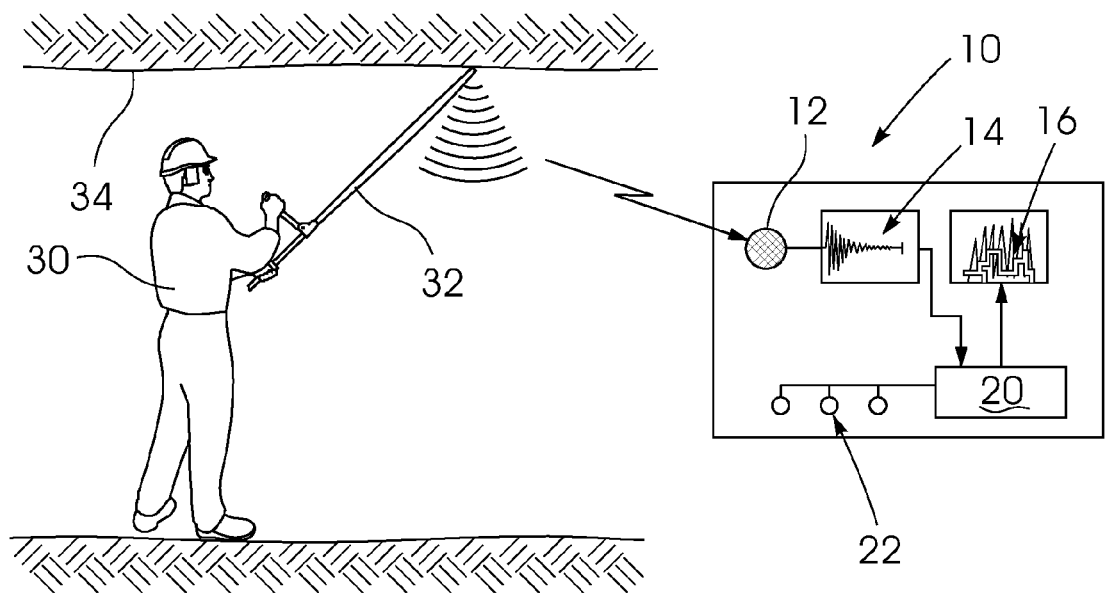
FIG. 1 shows an apparatus in accordance with the invention in diagrammatic form.

In FIG. 1, an apparatus 10 for assessing the integrity of a rock mass is shown. The apparatus 10 is shown in schematic block diagram format.

Acoustic capturing means having a microphone 12 can capture acoustic signals generated as a result of an impact to the rock mass. The capturing means includes circuitry (not shown) for capturing the acoustic signal and converting it to an analogue time domain signal, schematically indicated as reference numeral 14 in FIG. 1. The capturing means further includes an analogue to digital converter (not shown) for transforming an analogue time domain signal to a digital time domain signal.

Processing means in the form of a processor 20 is connected to the capturing means to convert the digital time domain signal 14 by means of a Fast Fourier transform to a frequency domain signal as indicated by reference numeral 16.

A neural network model is also implemented on the processor 20 for fitting the measured frequency domain signal values to a predefined frequency domain characteristic of a rock mass, which is representative of safe and unsafe rock conditions.

Presentation means in the form of a set of three Light Emitting Diodes (LED's) 22 are connected to the processor 20 for presenting to a user a signal indicative of the fitment of the measured frequency domain characteristics to the predefined frequency domain characteristics. Illumination of one of the LED's 22 provides a visual indication to a user of the integrity of the rock mass.

As can be seen in FIG. 1, in use, a user 30 uses a pinch bar 32 to impact the rock mass 34, thereby to generate the acoustic signal that is to be picked up by the microphone 12.

Figure 2:
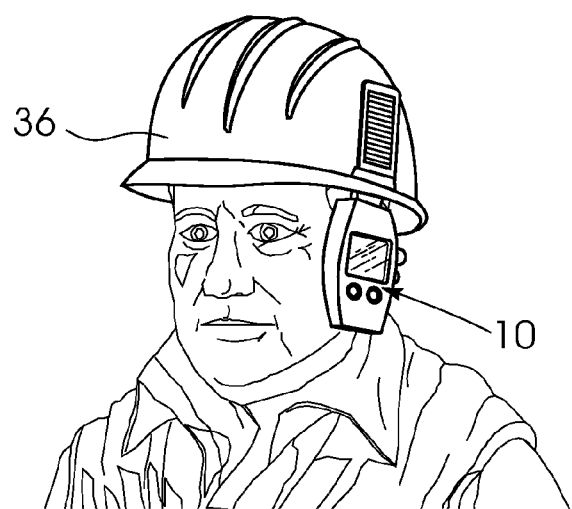
FIG. 2 shows an apparatus in accordance with the invention mounted to a miner's hardhat.

In FIG. 2, a small portable version of the apparatus 10 is mounted on a miner's hardhat 36. The version of the apparatus 10 on the miner's hardhat 36 is equipped with audio indication means, such as a speaker/buzzer to indicate to a user the integrity of the rock mass, without the miner having to look at the apparatus 10.

In use, the apparatus 10 implements a method of assessing the integrity of a rock mass. The method includes impacting the rock mass, as illustrated in FIG. 1, capturing an acoustic signal generated as a result of the impact as described above, deriving a frequency distribution for the captured signal; with the controller 20, processing data from the frequency distribution by means of a neural network algorithm trained to apply artificial intelligence to assess the inputted data, and presenting a signal from the neural network process which is indicative of the integrity of the rock mass.

Figure 3:
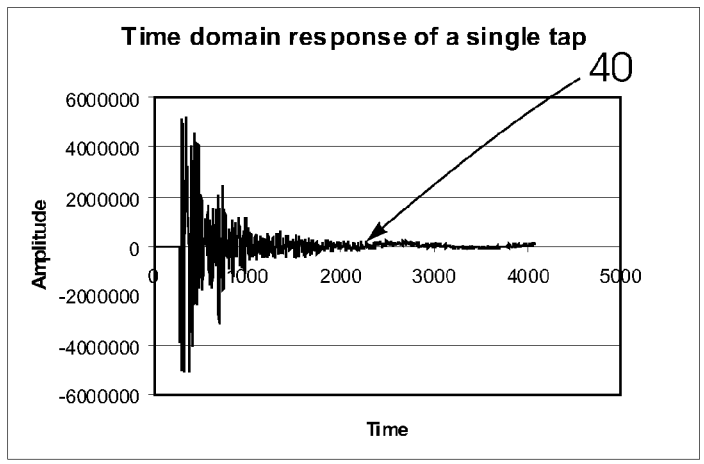
FIG. 3 shows a graph illustrating an acoustic response from a hanging wall in a mine working to which a single impact has been applied, in a time domain.

As can be seen in FIG. 3, the acoustic signal is captured as a time domain signal 40. The signal is stored in digital format by the processor 20 implementing a circular buffer.

When the pinch bar 32 impacts the rock mass 34, an event is triggered if the signal exceeds a predefined value, representative of the background noise. The signal, shown in FIG. 3 is then stored as a digital representation of the time domain signal.

Figure 4:
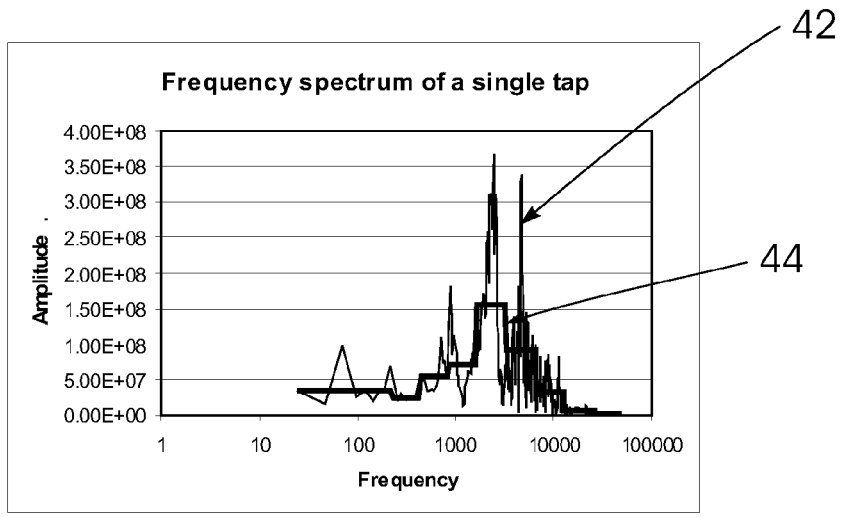
FIG. 4 shows a graph illustrating an acoustic response, transformed to a frequency distribution, for a relatively unstable hanging wall.

The time domain signal of FIG. 3 is transformed to a frequency domain signal, shown as 42, in FIG. 4, by means of a Fast Fourier transform algorithm.

The frequency domain signal of FIG. 4 shows a frequency distribution ranging over a frequency band of about 10 Hz to about 10 kHz. This frequency band has been divided into nine smaller discrete bands as follows: 20 Hz-50 Hz, 50 Hz-100 Hz, 100 Hz-200 Hz, 200 Hz-500 Hz, 500 Hz-1 KHz, 1 KHz-2 KHz, 2 kHz-5 KHz, 5 KHz-10 KHz, 10 KHz-20 KHz. However, it is to be appreciated that other frequency bands can be selected. The average values of the frequency domain signal in each frequency band is determined for the signal 42 of FIG. 4. The resultant average signal value is indicated as 44 on FIG. 4.

The signal values 44 are then fed into the processor 20 implementing a neural network algorithm and the characteristics are compared to characteristics representative of both safe and unsafe rock conditions.

Prior to use of the apparatus the neural network model must be trained and calibrated empirically to assess the inputted data so as to produce a classification of the hanging wall that is in accordance with the assessment which would be made by a miner skilled in the conventional art of assessing hanging wall integrity according to sounds which he hears when a hanging wall is tapped with the sounding bar. In practice, the skilled miner would be required to proved repeated assessments of the integrity of the hanging wall, using the conventional method of listening to the acoustic response when the hanging wall is tapped while, at the same time, the apparatus of the invention is also in use to input frequency distribution signals to the neural network, such that the artificial intelligence implemented by the neural network is continuously built up and expanded upon with the model being recalibrated as necessary in order to produce the most accurate assessments.

Depending on the accuracy of the fit of the measured value to the neural network model, the processor 20 generates an output via the LED's 22, or via an audible device indicating safe or unsafe rock conditions.

The LED's 22 have different colours, for example red, green and orange. In response to each assessment made by the neural network model, a selected one of these lights is illuminated under the control of the processor 20, where, for instance, the model classifies the frequency distribution as being one representative of stable hanging wall conditions, the green LED will be illuminated, Similarly, where the model classifies the frequency distribution as being one representative of unstable hanging wall conditions, the red LED will be illuminated. Where intermediate hanging wall conditions are detected, the orange LED will be illuminated.

Figure 5:
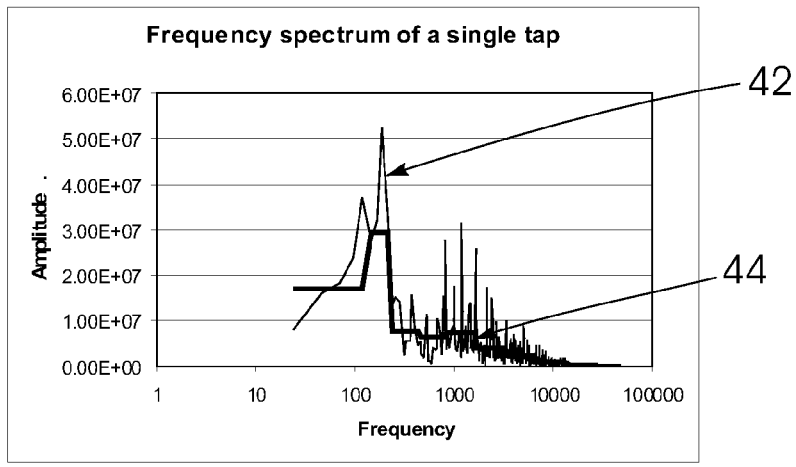
FIG. 5 shows a graph illustrating an acoustic response, transformed to a frequency distribution, for a relatively stable hanging wall.

Referring now to both FIGS. 4 and 5, the frequency domain response indicated in FIG. 4 is representative of unsafe rock conditions (i.e. an unstable hanging wall) while the frequency domain response indicated in FIG. 5 is representative of safe rock conditions (i.e. a stable hanging wall), of relatively high integrity.

It will be understood that the method will be carried out at different positions in the mine working and that when unstable or intermediate stability conditions are recognised by the neural network model, resulting in illumination of the red or orange LED, appropriate remedial action can be taken. This may for instance involve barring down of the unsafe areas of the hanging wall.

It will furthermore be understood that in order to be effective the apparatus 10 must be compact and portable so that integrity testing of the hanging wall can be carried out at different positions in each mine working.

The acoustic response, which is picked up by the microphone(s), can be affected by various factors including the length and composition of the sounding bar 32 and the force with which it is tapped against the rock mass being tested 34. In order to reduce the test variables the testing process should be standardized by, for instance, standardising the bar and testing procedure. The acoustic response is of course also affected greatly by the geotechnical nature of the rock mass and the type of mine working in question. For this reason the neural network model should be trained with data collected for similar environments for use in different geotechnical conditions and in different types of mine working.

An important advantage of the invention as exemplified above is the fact that it replaces the conventional, subjective assessment of rock mass integrity with a more objective and repeatable assessment.

The invention claimed is:

1. A method for assessing the integrity of a rock mass, the method comprising:
   impacting the rock mass;
   capturing on a processor an acoustic signal of the impact as a digitized time domain signal, the acoustic signal captured by a microphone;
   on a processor, deriving a frequency distribution of the time domain signal by applying a Fast Fourier Transform (FFT) to the time domain signal data and allocating the transformed frequency domain signal values to at least three predefined discrete measurement frequency bands;
   processing data from the frequency distribution by a neural network process implemented on the processor, thereby applying artificial intelligence to assess the inputted data;
   presenting a signal from the neural network process which is indicative of the integrity of the rock mass on any one of audible and visible presentation means; and
   continuously capturing the digitized time domain signal in a circular buffer on the processor, and recognizing an event when the captured, digitized, time domain signal exceeds a predefined threshold value measured against a moving average of the captured, digitized, time domain signal values in the circular buffer.

2. The method of claim 1, further comprising storing time domain signal values of the event on the processor.

3. The method of claim 2, wherein the derivation of the frequency distribution includes transforming the captured time domain signal of the event to a frequency domain signal using an FFT, implemented on the processor, once an event has been recognized.

4. The method of claim 3, wherein the derivation of the frequency distribution further includes defining discrete measurement frequency bands prior to transforming the captured time domain signal of the event to the frequency domain signal.

5. The method of claim 4, further comprising obtaining an average value of the transformed frequency domain signal values falling within each of the at least three predefined discrete measurement frequency bands to obtain on the processor a normalized signal value per discrete frequency band.

6. The method of claim 5, wherein the processing the data on the processor includes providing the normalized signal value to the neural network as an input.

7. The method of claim 6, wherein the processing the data on the processor includes receiving, from the neural network process on the processor, a signal indicative of the fitment of the transformed frequency domain signal characteristics to characteristics of the frequency domain signal with which the neural network process was trained.

8. The method of claim 7, further comprising training the neural network process with frequency domain signal characteristics representative of any one or both of safe and unsafe rock conditions.

9. The method of claim 8, wherein presenting the signal from the neural network process includes generating any one or both of an audio and a visual signal on presentation means to indicate whether the measured signal values correspond with characteristics of any one or both of safe and unsafe rock conditions.

10. An apparatus for assessing the integrity of a rock mass, the apparatus including
capturing means for capturing an acoustic time domain signal as a digitized time domain signal generated as a result of an impact applied to the rock mass;
a processor connected to the capturing means for deriving frequency domain signal values by means fo Fast Fourier transform algorithms from the captured time domain acoustic signal values, the processor further operable to allocate the derived frequency domain signal values into at least three predefined frequency bands;
a neural network model for fitting the derived frequency domain signal values onto predefined frequency domain characteristics of a rock mass which is representative of any one or both of safe and unsafe rock conditions;
presentation means for presenting a signal indicative of the fitment of the measured frequency domain characteristics to the predefined frequency domain characteristics to provide an indication of the integrity of the rock mass; and
continuously capturing the digitized time domain signal in a circular buffer on the processor, and recognizing an event when the captured, digitized, time domain signal exceeds a predefined threshold value measured against a moving average of the captured, digitized, time domain signal values in the circular buffer.

11. The apparatus of claim 10, in which the capturing means includes a solid-state memory addressed in the circular buffer.

12. The apparatus of claim 11 in which the neural network model is programmed into the processor to generate an output value indicative of the integrity of the rock mass.

13. The apparatus of claim 12, in which the presentation means includes any one or both of audio and visual indicators arranged to indicate fitment of the measured frequency domain characteristics to the predefined frequency domain characteristics of any one or both of safe and unsafe rock profiles.

14. The apparatus of claim 13, in which the visible indicator in the form of at least one Light Emitting Diode.

15. The apparatus of claim 13, in which the audio indicator is arranged to generate different sounds depending on a fitment value received from the neural network model.

16. The apparatus of claim 10, in which the processor is programmed with Fast Fourier transform algorithms for converting measured time domain signal values to frequency domain signal values.

17. The apparatus of claim 10, in which the processor is programmed to allocate the measured frequency domain signal values to predefined frequency bands.

18. The apparatus of claim 10, in which the processor is programmed to obtain an average value for the measured frequency signal values per predefined frequency band.

19. The apparatus of claim 10, which is compact and hand portable.

20. The apparatus of claim 19, which is adapted for mounting to a miner's hardhat.

* * * * *